No. 754,291. PATENTED MAR. 8, 1904.
A. C. EASTWOOD.
MAGNETIC CLUTCH.
APPLICATION FILED JAN. 26, 1904.
NO MODEL.
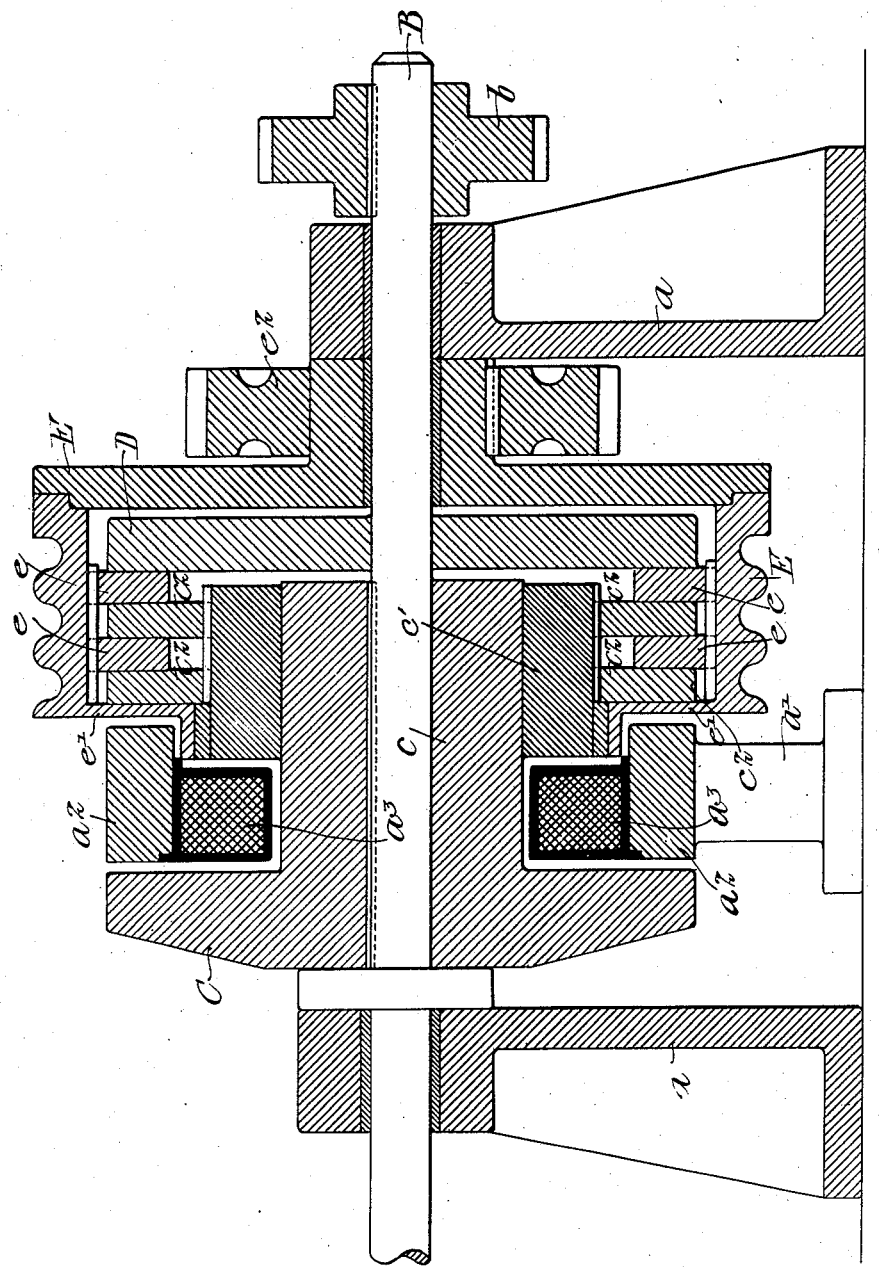
Witnesses:
Wesley H. Reel
Titus H. Gross
Inventor:
Arthur C. Eastwood,
by his Attorneys:

No. 754,291. Patented March 8, 1904.

UNITED STATES PATENT OFFICE.

ARTHUR C. EASTWOOD, OF CLEVELAND, OHIO.

MAGNETIC CLUTCH.

SPECIFICATION forming part of Letters Patent No. 754,291, dated March 8, 1904.

Application filed January 26, 1904. Serial No. 190,724. (No model.)

*To all whom it may concern:*

Be it known that I, ARTHUR C. EASTWOOD, a citizen of the United States, residing in Cleveland, Ohio, have invented certain Improvements in Magnetic Clutches, of which the following is a specification.

My invention relates to certain new and useful improvements in magnetic friction-clutches, the object of the same being to provide a clutch of such construction that it shall be relatively powerful in proportion to its size and weight.

A further object of the invention is to so arrange the various parts of a clutch that it will dissipate relatively large amounts of energy in the form of heat without danger of injury to itself.

It is further desired to provide a device in which the magnetizing-coil shall be stationary and independent of the frictional members of the clutch, thereby doing away with the necessity for brushes and contact-rings, otherwise necessarily employed to convey current to said coil.

It is also desired to so arrange the parts of a clutch of the general construction outlined above that the magnetic pull will be balanced along the shaft in such manner as not to cause end thrust upon the bearings.

These objects I attain in the manner hereinafter set forth, reference being had to the accompanying drawing, in which the figure is a sectional elevation taken through the supporting-shaft and illustrating in detail the construction of my improved clutch.

The most common form of magnetic clutches at present in use includes an annular electromagnet with an armature-plate of disk form mounted upon a common shaft, one of these members being keyed to said shaft and the other loosely mounted thereon, so that it may be free to revolve. Power is usually transmitted from a source of power to the magnet, and when this is energized it attracts and is operatively coupled to the armature which is permanently attached to the apparatus to be driven. In this form of clutch current must be led to the magnetizing-coil of the clutch-magnet through brushes bearing upon a pair of collector-rings, the insulation and mountings of which as well as that of the revolving magnetizing-coil forming considerable items of expenditure both as regards their first cost as well as their maintenance. In my improved clutch since the magnetizing coil or coils is stationary both the collector-rings and brushes are altogether dispensed with, it being noted that for this same reason said coil is not subjected to the action of centrifugal force and may consequently be of a much less costly construction than has hitherto been employed. Further, in the common forms of clutches there is a frictional contact between one of the pole-faces of the electromagnet and the armature-disk, and when the driven member of the clutch is attached to a load and the driving member is turned at full speed it is evident that there must be more or less slipping in starting said load, which slipping necessarily generates heat. When such starting occurs at very frequent intervals, the heat so generated becomes a serious item, since it is possible that it may be produced faster than it can be dissipated, with the result that the temperature of the clutch will continue to rise until the coil or some other part of the clutch is injured. This tendency is particularly noticeable when the clutch is used in connection with a metal planer operating on a short stroke, the conditions being further aggravated from the fact that at the instant of reversal of the platen the clutch must absorb the energy due to the momentum of this part with its load and must afterward reverse and accelerate the motion of the combined mass in an opposite direction. It will be understood that on a very short stroke this transferrence of energy becomes practically continuous, so that serious injury would certainly be done, and one of the advantages of my improved structure is that it is so constructed as to simply and effectually dissipate the heat generated without permitting any undue rise in the temperature of any of the parts of the device.

In the above drawings, A is the supporting-base, on which are standards $a$, having bearings for the shaft B, which, if desired, may connect to any desired source of power through a gear $b$. Also supported on said piece is a third standard $a'$, carrying a ring-shaped piece of iron or steel $a^2$, within which is wound the magnetizing-coil $a^3$, this latter being held in position within the ring in any of the well-known ways and being provided with terminals (not shown) through which it is supplied with current.

Keyed to the shaft B is an armature-disk C, having a cylindrical portion $c$ extending through and beyond the magnetizing-coil $a^3$, there being upon the end of said extended portion $c$ a ring $c'$ of some non-magnetic material, such as brass. In addition there is also keyed to the shaft B at the end of the extended cylindrical portion of the armature-disk a plate D of magnetic material, having a diameter preferably the same as that of said disk.

Keyed or otherwise fixed to the brass ring $c'$ are any desired number of rings $c^2$, in the present instance two, there being interposed between these and also between one of them and the end disk D other rings $e$, keyed or otherwise operatively fixed to the second member of the clutch E, whose external surface is preferably formed with corrugations or other equivalent construction by which a large amount of heat-radiating surface may be obtained. The end $e'$ of this member E, I preferably extend inwardly between one of the rings $c^2$ and the face of the fixed magnetizing-ring $a^2$, so as to form an inclosed fluid-tight casing around the various rings. I also provide a gear $e^2$, keyed to the member E, whereby power may be transmitted to any mechanism or apparatus which it is desired to drive.

When under ordinary conditions the shaft B, with its connected parts, is driven from a source of power and the magnetizing-coil $a^3$ is supplied with current, the flow of the lines of force will take place, as indicated, through the armature-disk C and its portion $c$, the disk D, the rings $e$ and $c^2$, and through the ring $a^2$, thereby causing said rings $e$ and $c^2$ to be drawn together with a heavy pressure and effectually coupling the member E to the armature C, and consequently to the shaft B.

The joint between the inwardly-projecting portion $e'$ and the brass ring $c'$ is liquid-tight, and the interior of the case E is filled with oil or other liquid which not only lubricates the various rubbing surfaces, but also serves to conduct heat generated by friction of said surfaces to the outer portions of the case, from which it will be rapidly radiated by the corrugations or other extended surfaces. It will further be noted that all of the magnetic lines of force pass through the armature C, disk D, and case E, with their attached parts, in such a manner that the pull exerted will have an equal effect on both of the revoluble members of the clutch, so that they will be in equilibrium relatively to the fixed coil $a^3$ and its supporting pole-piece $a^2$. Hence there will be no unbalanced thrust along the shaft and no tendency for any of the parts to be drawn against said pole-piece $a^2$.

I claim as my invention—

1. A magnetic clutch including two revolubly-supported members, each having a series of rings fixed to it with a stationary coil placed to act on said rings to operatively couple the members, substantially as described.

2. A clutch having two members constructed to frictionally engage each other, a casing inclosing the engaging surfaces of said members, liquid in said casing, and a magnet for drawing said two members together, substantially as described.

3. A stationary magnet, two members constructed to frictionally engage each other and placed to be drawn together by said magnet, with a casing inclosing said members and a liquid in said casing, substantially as described.

4. The combination of a fixed magnet, a pair of rings of magnetizable material both on the same side of the magnet and connected respectively to the driving and driven apparatus with an armature on the opposite side of the magnet from the rings, substantially as described.

5. The combination in a clutch of a fixed magnetizing-coil, a flanged body of metal extending through said coil, a ring of non-magnetic metal adjacent to the coil, a series of rings of magnetizing material on said first ring, a second series of rings of magnetizing material, independent of the other series, said rings being placed to be included in the magnetic circuit of the magnet, substantially as described.

6. The combination of two series of parallel rings, supporting-pieces for each of said sets of rings, certain of the same forming a closed casing, with a magnet and a core therefor, said magnet being placed to include the rings in its magnetic circuit, substantially as described.

7. The combination of a casing having a surface provided with projecting portions, bodies of metal attached to said casing, an armature having portions within said casing placed to coact with the bodies of metal therein, liquid in the casing and a magnet placed to act on the armature and on the bodies of metal coacting with the same to draw them together, substantially as described.

8. The combination of a liquid-tight casing having a portion operatively connected to a driving device and another portion connected to a driven device, frictionally-coacting bodies of metal within the casing and connected to its respective parts, with a magnet placed to act on the said bodies of metal to draw them together, substantially as described.

9. The combination of a ring of magnetizable metal, a coil supported thereby in a fixed position, a disk revolubly supported on one side of the coil having a portion extending through the same, a body of non-magnetizable metal on said portion, a metallic ring on said body of metal, a second disk also having a metallic ring coacting with the other ring with means for dissipating heat generated by the frictional engagement of said two rings, substantially as described.

10. A clutch having members constructed to frictionally engage each other to couple a driving with a driven device, means for causing said members to grip each other, and a casing surrounding the members, with liquid in the casing bathing portions of the said members, substantially as described.

11. A clutch having members constructed to frictionally engage each other to couple a driving with a driven device, means for causing said members to grip each other, and a casing surrounding the members, with a liquid in the casing bathing portions of said members, said casing having its peripheral portion roughened and made with a relatively extended surface, substantially as described.

12. The combination of a casing having within and fixed to it a metallic ring; a shaft passing through the casing and also having a ring fixed to it, an armature coacting with one of the rings and a relatively stationary magnet placed to act on said rings and armature, substantially as described.

13. The combination of a shaft having on it an armature-plate and a series of rings, a sleeve also on said shaft having connected to it a second series of rings placed to coact with those of the first series, means for connecting the shaft and the sleeve between a driving and a driven device, with a magnet between the armature-plate and said two series of rings, substantially as described.

In testimony whereof I have signed my name to this specification in the presence of two subscribing witnesses.

ARTHUR C. EASTWOOD.

Witnesses:
C. W. COMSTOCK,
J. E. WELLMAN.